United States Patent [19]

Miyoshi et al.

[11] Patent Number: 4,739,855
[45] Date of Patent: Apr. 26, 1988

[54] VEHICLE STEERING SYSTEM HAVING A STEERING RATIO CHANGING MECHANISM

[75] Inventors: Akihiko Miyoshi; Hitoshi Nakashima; Hirotaka Kanazawa; Masaki Watanabe; Takeshi Tanaka; Shigeuki Okimoto; Norio Tsukaana, all of Hiroshima, Japan

[73] Assignee: Mazda Motor Corporation, Japan

[21] Appl. No.: 886,739

[22] Filed: Jul. 18, 1986

[30] Foreign Application Priority Data

Jul. 22, 1985 [JP] Japan .................... 60-161615
Aug. 5, 1985 [JP] Japan .................... 60-172225

[51] Int. Cl.$^4$ .................................... B62D 5/04
[52] U.S. Cl. ......................... 180/142; 180/79.1; 180/143
[58] Field of Search ............ 180/141, 142, 143, 79.1, 180/79, 132; 318/488, 489

[56] References Cited

U.S. PATENT DOCUMENTS 4,570,734 2/1986 Taig .................... 180/79.1

FOREIGN PATENT DOCUMENTS

| 35035 | 3/1977 | Japan | 180/79.1 |
|---|---|---|---|
| 100031 | 8/1979 | Japan | 180/143 |
| 58-224852 | 4/1983 | Japan . | |
| 688368 | 9/1979 | U.S.S.R. | 180/141 |
| 1100179 | 6/1984 | U.S.S.R. | 180/141 |

Primary Examiner—John J. Love
Assistant Examiner—Everett G. Diederiks, Jr.
Attorney, Agent, or Firm—Gerald J. Ferguson, Jr.; Michael P. Hoffman; Michael J. Foycik, Jr.

[57] ABSTRACT

A steering system for a vehicle comprises a front wheel turning mechanism for turning the front wheels in response to operation of a steering wheel, a steering ratio changing mechanism inserted into the front wheel turning mechanism to change the ratio of the turning angle of the steering wheel to the turning angle of the front wheels, and a vehicle speed sensor for detecting the vehicle speed. The steering ratio changing mechanism is controlled to increase the ratio as the vehicle speed increases, and as the vehicle speed increases, the control speed of the steering ratio changing mechanism is lowered.

7 Claims, 6 Drawing Sheets

VEHICLE STEERING SYSTEM HAVING A STEERING RATIO CHANGING MECHANISM

BACKGROUND OF THE INVENTION

1. Field of the Invention

This invention relates a steering system for a vehicle, and more particularly to a steering system for a vehicle in which the steering ratio, that is, the ratio of the turning angle of the steering wheel to the turning angle of the dirigible wheels, is variable.

2. Description of the Prior Art

As is well known, in the steering system of a vehicle, rotary motion of the steering wheel is converted into lateral sliding motion of tie rods by way of a steering gear such as a rack-and-pinion mechanism and right and left dirigible wheels connected to the ends of the tie rods are turned in response to the sliding motion of the tie rods. Conventionally, the steering ratio, i.e., the ratio of the turning angle of the steering wheel to the turning angle of the dirigible wheels (which are generally the front wheels) has been fixed. However, it is preferred in view of running stability that the steering ratio be increased to reduce the turning angle of the front wheels for a given turning angle of the steering wheel during high speed travel. On the other hand, when the vehicle speed is low, it is preferred that the steering ratio be reduced to increase the turning angle of the front wheels for a given turning angle of the steering wheel, thereby improving response of the vehicle to operation of the steering wheel and facilitating control of the vehicle position.

Thus, there has been proposed in Japanese Unexamined Patent Publication Nos. 58(1983)-224852 and 54(1979)-100031 a speed-responsive steering system in which the steering ratio is changed according to the vehicle speed. In the steering system, there is provided between the steering wheel and the steering column a transmission mechanism comprising a pair of variable pitch pulleys and a V-belt passed around the pulleys, the pitch diameter of the driven pulley being arranged to be increased by a stepping motor as the vehicle speed increases.

The speed responsive steering system has to be arranged such that the turning angle of the front wheels is changed when the vehicle speed changes with the turning angle of the steering wheel fixed. Otherwise, the front wheels cannot be returned to the neutral position when the steering wheel is returned to the neutral position. However since the driving speed of the stepping motor, i.e., the control speed of the steering ratio, is fixed irrespective of the vehicle speed, and since failure of the controller for controlling the stepping motor is generally detected a predetermined time after the occurrence of the failure, the turning angle of the front wheels is changed by the same amount irrespective of the vehicle speed by the time the failure is detected. Accordingly, the turning angle of the front wheels can be changed by amount exceeding a proper range when the vehicle speed is high.

When the driving speed of the stepping motor is reduced to obviate such danger at high speed, the response to operation of the steering wheel will be adversely affected.

SUMMARY OF THE INVENTION

In view of the foregoing observations and description, the primary object of the present invention is to provide a speed-responsive steering system for a vehicle in which said amount exceeding a proper range which can occur in case of failure of the controller at high speed can be obviated without adversely affecting the response and the follow of the vehicle to operation of the steering wheel at low speed.

The steering system in accordance with the present invention comprises a dirigible wheel turning mechanism for turning the dirigible wheels in response to operation of a steering wheel, a steering ratio changing mechanism inserted into the dirigible wheel turning mechanism to change the ratio of the turning angle of the steering wheel to the turning angle of the dirigible wheels, a vehicle speed sensor for detecting the vehicle speed, a first control means for controlling the steering ratio changing mechanism to increase the ratio as the vehicle speed increases, and a second control means for reducing, as the vehicle speed increases, the control speed of the first control means in controlling the steering ratio changing mechanism.

With this arrangement, the amount by which the turning angle of the dirigible wheels is changed for the time between occurrence of failure of the controller and detection of the failure can be limited at high speed without sacrificing the response or the follow of the vehicle to operation of the steering wheel at low speed even if the time is fixed irrespective of the vehicle speed.

DESCRIPTION OF THE PREFERRED EMBODIMENT

Figure 1:
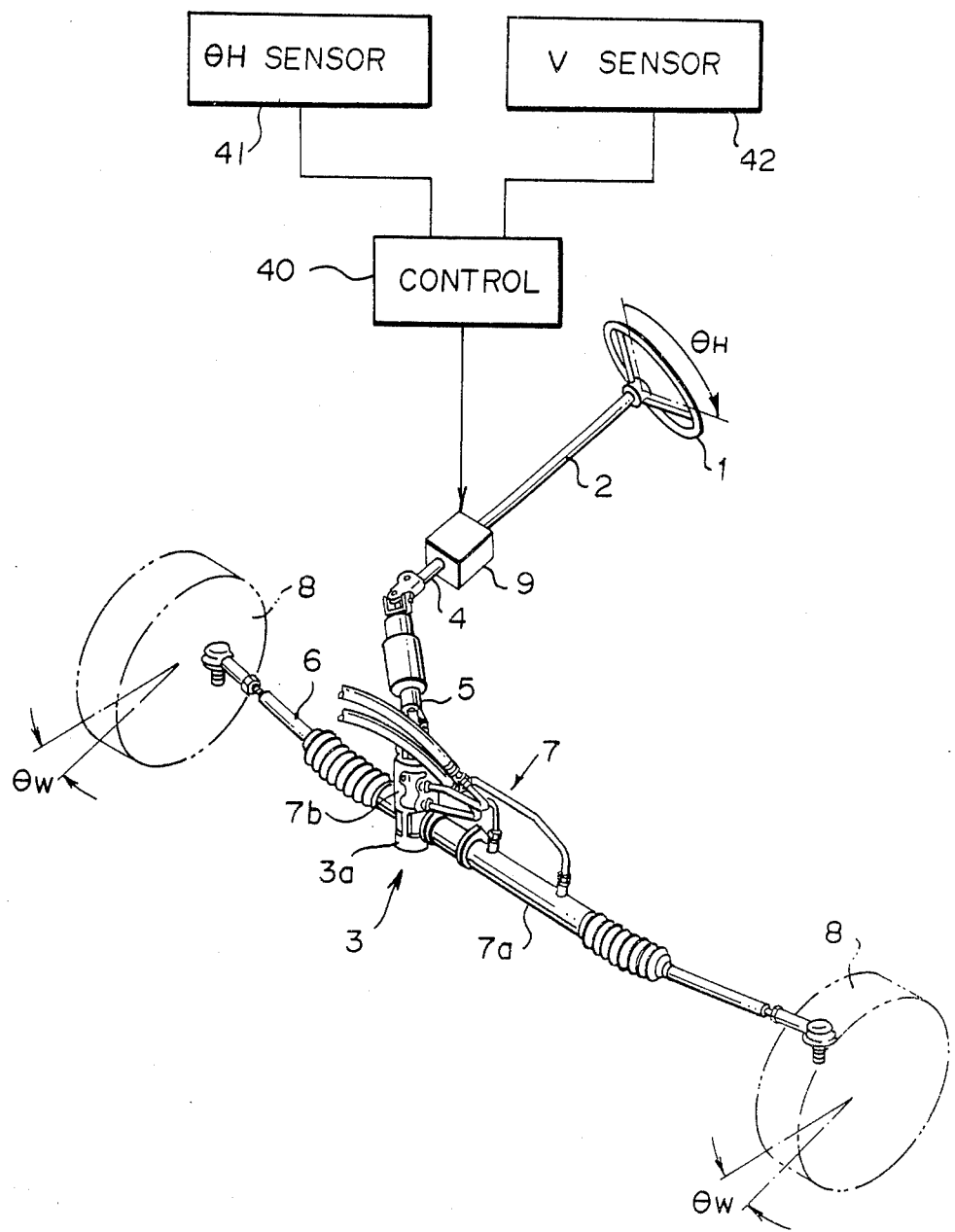
FIG. 1 is a schematic perspective view showing a steering system in accordance with an embodiment of the present invention.

In FIG. 1, a steering system in accordance with an embodiment of the present invention includes a steering wheel 1 operatively connected to front wheels 8 by way of a steering gear 3, tie rods 6 and knuckle arms (not shown). The steering gear 3 is of a rack-and-pinion type having a pinion (not shown) connected to the steering wheel 1 by way of first and second intermediate shafts 4 and 5 and a steering shaft 2 and a rack (not shown) connected to the right and left front wheels 8 by the tie rods 6 and the knuckle arms. The rack and pinion are housed in a steering gear box 3a. The steering gear 3 is provided with a power steering system 7 comprising a power cylinder 7a inserted between the rack and the left tie rod 6, and a rotary control valve 7b provided on the steering gear box 3a to control feed of the hydraulic pressure to the power cylinder 7a in response to operation of the steering wheel 1.

Figure 2:
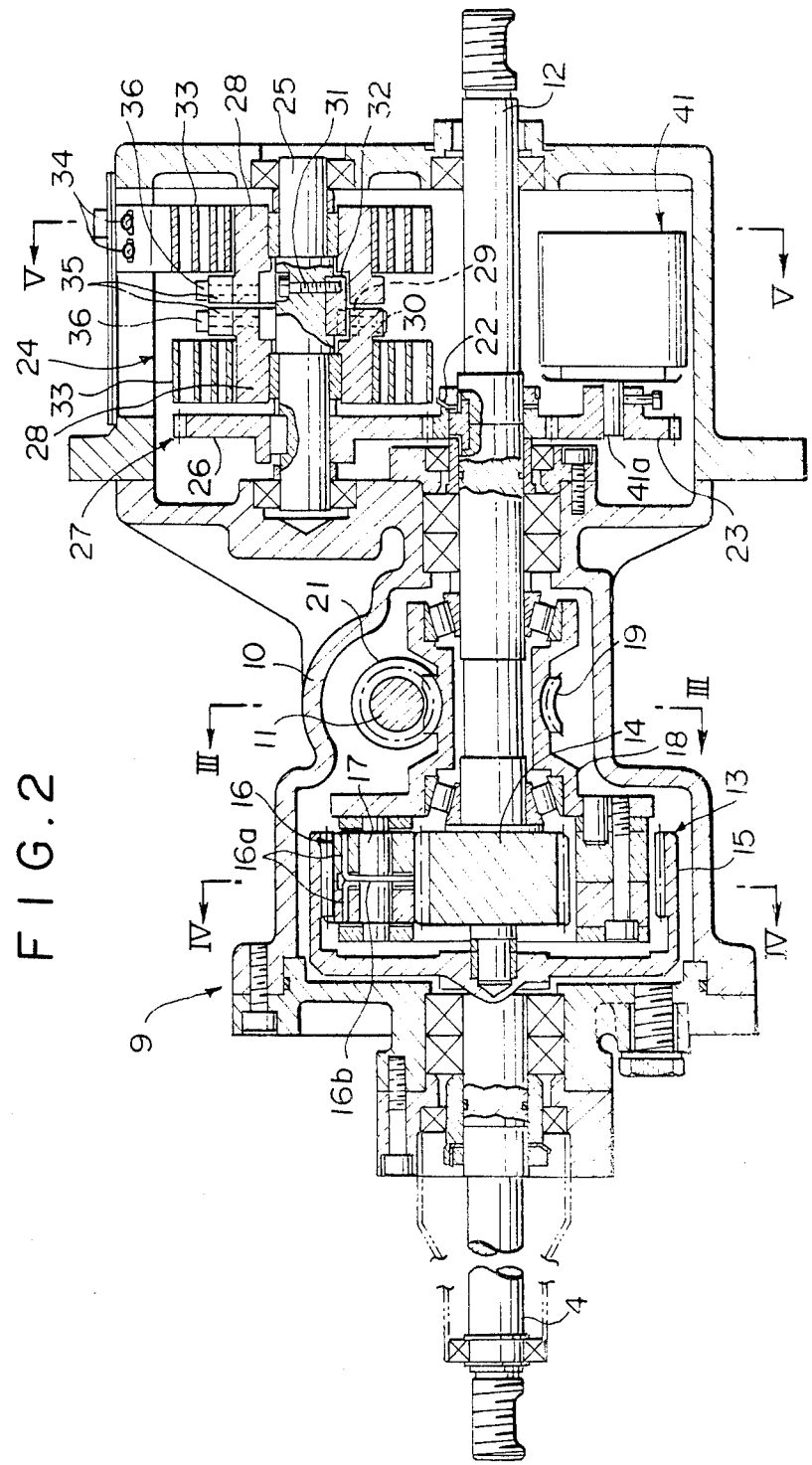
FIG. 2 is a fragmentary cross-sectional view showing the steering ratio changing mechanism and the parts associated therewith.
Figure 3:
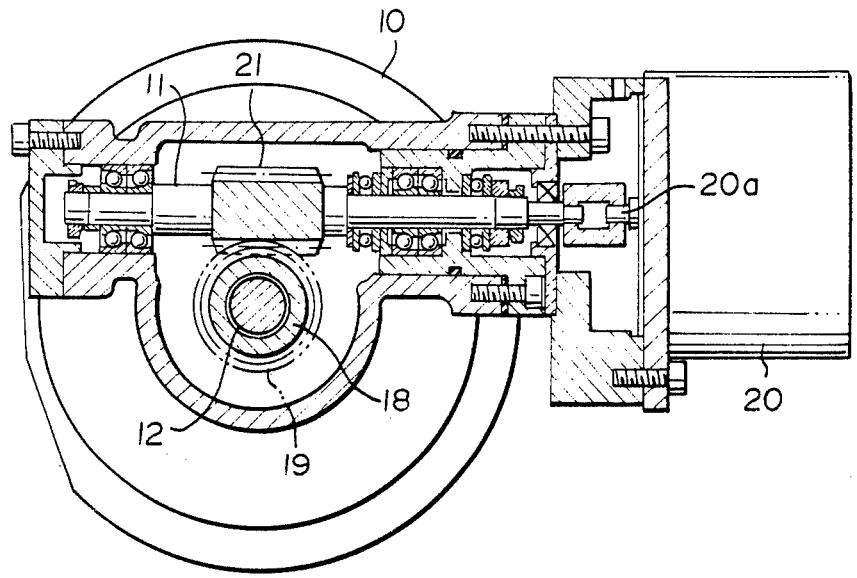
FIGS. 3 to 5 are cross-sectional views respectively taken along lines III—III, IV—IV and V—V in FIG. 2.
Figure 4:
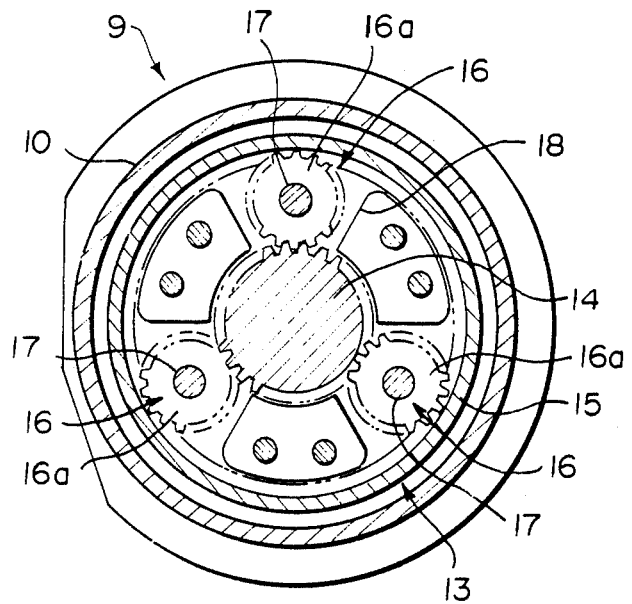
Figure 5:
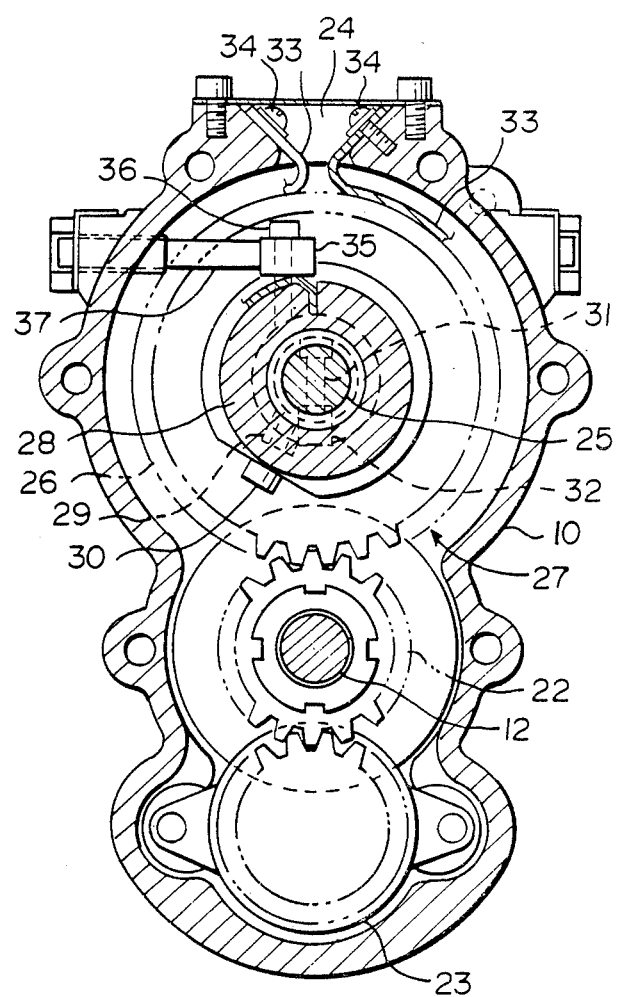

The steering shaft 2 is connected to the first intermediate shaft 4 by way of a steering ratio changing mechanism 9 for changing the steering ratio R, that is, the ratio of the turning angle $\theta_H$ of the steering wheel 1 to the turning angle $\theta_W$ of the front wheels 8 ($R = \theta_H/\theta_W$). As shown in FIGS. 2 to 4, the steering ratio changing mechanism 9 includes a planetary-gear type differential gear mechanism 13 housed in a housing 10. The upper end of the first intermediate shaft 4 is inserted into the housing and an input shaft 12 is opposed to the first intermediate shaft 4 in alignment therewith. The input shaft 12 is drivingly connected to the steering shaft 2. The differential gear mechanism 13 is provided between the first intermediate shaft 4 and the input shaft 12. The differential gear mechanism 13 comprises a sun gear 14 fixed to the input shaft 12, a ring gear 15 fixed to the first intermediate shaft 4, and three planet pinions 16 which are equiangularly spaced from each other and are in mesh with both the sun gear 14 and the ring gear 15. The planet pinions 16 are carried by a pinion carrier 18 by way of pinion shafts 17. The pinion carrier 18 receives the input shaft 12 for relative rotation between the two. On the outer periphery of the pinion carrier 18 is formed a worm wheel 19 and the worm wheel 19 is in mesh with a worm 21 fixed to a rotary shaft 11. The rotary shaft 11 is connected to an output shaft 20a of a stepping motor 20. The stepping motor 20 rotates the pinion carrier 18 about the input shaft 12 by way of the worm wheel 19 and the worm 21 to rotate the planet pinions 16 between the sun gear 14 and the ring gear 15, whereby the ratio of the amount of rotation of the steering shaft 2 to the amount of rotation transmitted to the first intermediate shaft 4, that is the steering ratio R, is controlled.

Though not shown in FIG. 1, a resistance device 24 for matching against operation of the steering wheel 1 is mounted on the steering shaft 2 adjacent to the steering ratio changing mechanism 9. The resistance device 24 includes a spring shaft 25 which is supported for rotation on the housing 10 in parallel to the input shaft 12. To the spring shaft 25 is integrally fixed a driven gear 26 in mesh with a driving gear 22 on the input shaft 12. The diameter of the driven gear 26 is larger than that of the driving gear 22 and a reduction gear 27 is formed by the driving gear 22 and the driven gear 26. The diameters of the gears 22 and 26 are selected so that when the steering wheel 1 is rotated to the maximum, the spring shaft 25 makes one revolution. A pair of tubular spring mounting members 28 surround the spring shaft 25 for rotation coaxially with the spring shaft 25. An engaging piece 29 is mounted on each spring mounting member 28 by a bolt 30 to project toward the spring shaft 25 from the inner peripheral surface thereof. A retainer key 32 is fixed to the spring shaft 25 by a bolt 31 to be adapted to engage with the engaging pieces 29 of the respective mounting members 28. By way of the engagement between the retainer key 32 and the engaging pieces 29, the spring mounting members 28 are rotated integrally with the spring shaft 25. A pair of spiral springs 33 are wound around the spring mounting members 28 in opposite directions. The inner end of each spiral spring 33 is retained on the corresponding spring mounting member 28 and the outer end of each spiral spring 33 is fixed to the housing 10 by bolts 34, whereby the spring mounting members 28 are urged in opposite directions. Further, on the outer peripheral surface of each spring mounting member 28 is fixedly mounted an abutment member 35 by a bolt 36 at a position substantially corresponding to the engaging piece 29. A stopper 37 in the form of a bolt is mounted on the housing 10 to extend through the housing 10 to be adapted to abut against the abutment member 35 to stop rotation of the corresponding spring mounting member 28. When the abutment member 35 of each spring mounting member 28 abuts against the stopper 37, that is, when the steering wheel 1 is in the neutral position, the spiral springs 33 are not relieved and the spring mounting members 28 are urged toward the respective directions, the urging forces of the spiral springs 33 cancelling by way of the spring shaft 25. When the spring shaft 25 is rotated in one direction in response to operation of the steering wheel 1, one of the spring mounting member 28 is rotated together with the spring shaft 25 by way of engagement of the retainer key 32 and the engaging piece 29 overcoming the force of the corresponding spiral spring 33. The force of the spiral spring 33 matches against the operation of the steering wheel 1.

Figure 6:
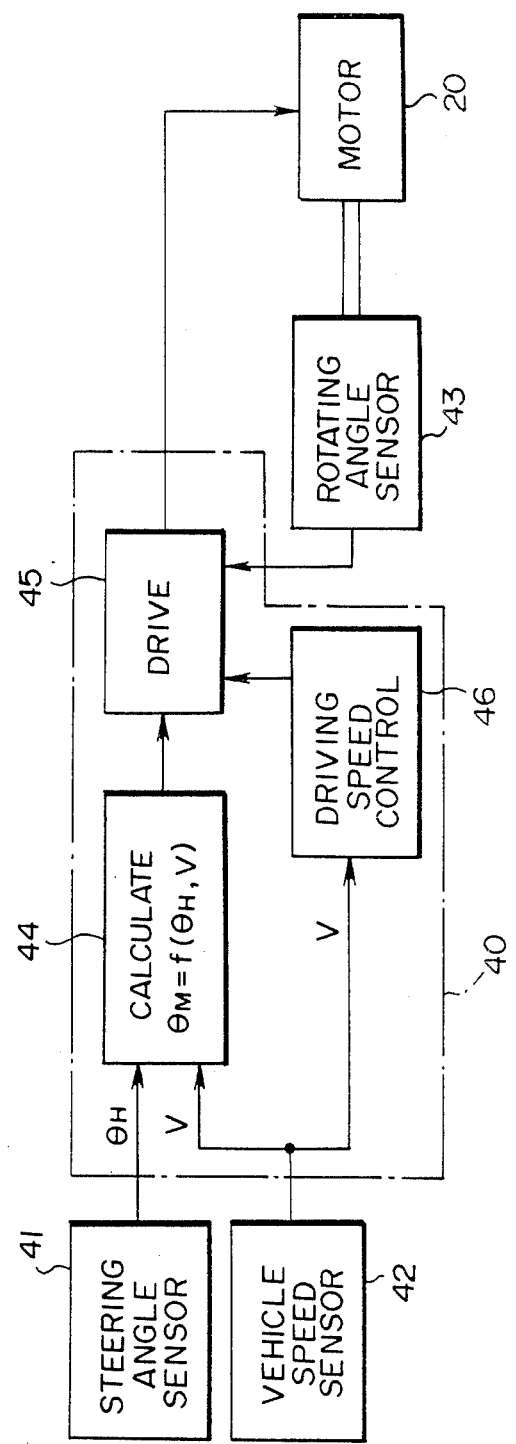
FIG. 6 is a block diagram showing the arrangement of the controller.
Figure 7:
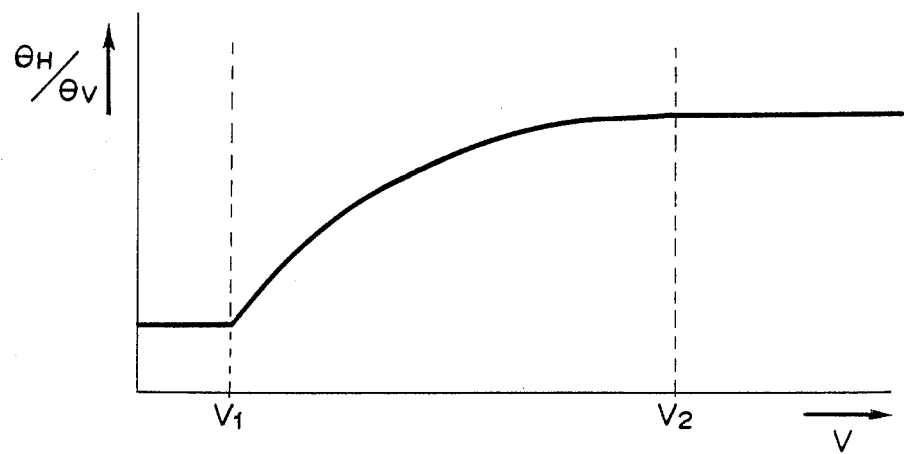
FIG. 7 is a graph showing the steering ratio-vehicle speed characteristic map based on which the controller controls the steering ratio changing mechanism.
Figure 8:
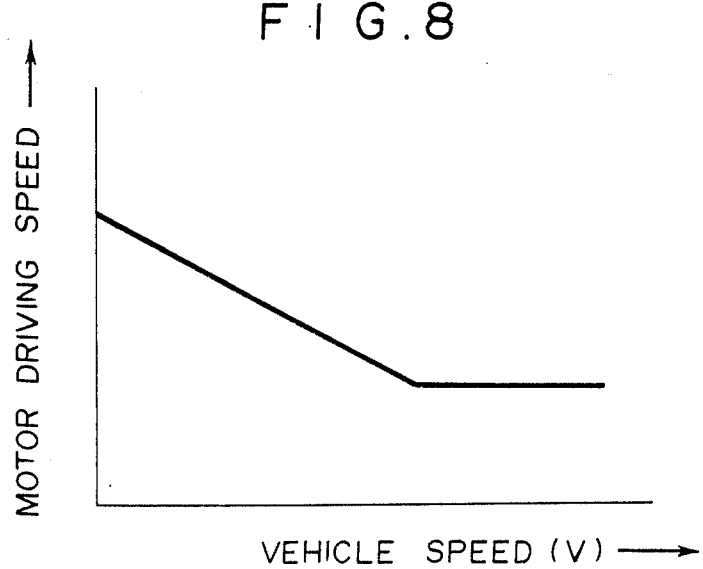
FIG. 8 is a graph showing the motor driving speed-vehicle speed characteristics map based on which the controller controls the driving speed of the stepping motor of the steering ratio changing mechanism.

The stepping motor 20 is controlled by a controller 40 (FIG. 1) which is a computer in this particular embodiment. The controller 40 receives output signals from a steering angle sensor 41 for detecting the turning angle of the steering wheel 1 i.e. the steering angle $\theta_H$ and a vehicle speed sensor 42 for detecting the vehicle speed v. In the following discussion, the symbol $\theta_W$ indicates a detected steering angle of the dirigible wheels. The controller 40 determines a target steering ratio R ($= \theta_H/\theta_W$) according to the detected steering angle $\theta_H$ and the detected vehicle speed v based on a predetermined characteristic map shown in FIG. 7 and drives the stepping motor 20 according to the target steering ratio R. Further, the controller 40 changes the driving speed of the stepping motor 20 according to the vehicle speed v based on a predetermined characteristic map shown in FIG. 8. That is, the controller 40 comprises, as shown in FIG. 6, a calculating section 44 which determines the target steering ratio R according to the detected steering angle $\theta_H$ and the detected vehicle speed v based on the characteristic map shown in FIG. 7 and calculates a target rotating angle $\theta_M = f(\theta_H, V)$ of the stepping motor 20 corresponding to the target steering ratio R, a motor driving section 45 which delivers to the stepping motor 20 a pulse signal for driving the stepping motor 20 so that the actual rotating angle of the motor 20 detected by a position sensor 43 coincides with the target rotating angle $\theta_M$, and a driving speed control section 46 which controls the driving speed of the stepping motor 20 according to the vehicle speed v based on a predetermined characteristic map shown in FIG. 8. As can be understood from the characteristic map shown in FIG. 7, the stepping motor 20 is controlled to control the steering ratio changing mechanism 9 so that the steering ratio is fixed at a predetermined value when the vehicle speed is very low (lower than a first predetermined speed V1), thereby ensuring drivability at the very low speed, is increased as the vehicle speed increases when the vehicle speed is between the first predetermined speed V1 and a second predetermined speed V2, and is fixed when the vehicle speed is very high (higher than the second predetermined speed), thereby ensuring running stability at the very high speed. As can be understood from the characteristic map shown in FIG. 8, the driving speed control section 46 controls the motor driving section 45 so that the driving speed of the stepping motor 20 is reduced as the vehicle speed increases when the vehicle speed is lower than a predetermined value and is fixed at a predetermined value irrespective of the vehicle speed when the vehicle speed exceeds the predetermined value. More particularly, the driving speed control section 46 determines a target motor driving speed corresponding to the detected vehicle speed based on the map shown in FIG. 8, and changes the number of pulses generated from the motor driving section 45 in a given time interval so that the driving speed of the stepping motor 20 coincides with the target motor driving speed.

When the steering wheel 1 is rotated while the vehicle is running, the rotation of the steering wheel 1 is transmitted to the input shaft 12 of the steering ratio changing mechanism 9 by way of the steering shaft 2 to rotate the sun gear 14 of the differential gear mechanism 13. The turning angle $\theta_H$ of the steering wheel 1 is detected by the steering angle sensor 41 and the vehicle speed at that time is detected by the vehicle speed sensor 42, and the controller 40 delivers driving pulses to the stepping motor 20. The stepping motor 20 rotates the pinion carrier 18 by way of the worm 21 and the worm wheel 19. The ring gear 15 of the differential gear mechanism 13 and the first intermediate shaft 4 are rotated by an angle obtained by adding or subtracting the rotating angle of the pinion carrier 18 to or from the turning angle $\theta_H$ of the steering wheel 1 depending on the rotational direction of the pinion carrier 18 or the stepping motor 20. Thus, the ratio of the turning angle of the steering wheel 1 to the turning angle of the intermediate shaft 4 (which determines the turning angle $\theta_W$ of the front wheels 8) is controlled by controlling the rotating angle of the stepping motor 20. The number of pulses to be delivered to the stepping motor 20 is determined so that the target steering ratio r determined according to the rotating angle $\theta_H$ of the steering wheel 1 and the vehicle speed V based on the characteristic map shown in FIG. 7 can be obtained, and the number of the pulses to be delivered to the stepping motor 20 in a given interval is determined so that the driving speed of the stepping motor 20 determined according to the vehicle speed based on the characteristic map shown in FIG. 8 can be obtained.

Thus, in the steering system in accordance with this embodiment, the steering ratio is increased as the vehicle speed increases, thereby improving stability at high speed, and is reduced at the vehicle speed is lowered, thereby improving the response and the follow of the vehicle to operation of the steering wheel. At the same time, the driving speed of the stepping motor 20 is low when the vehicle speed is high and is high when the vehicle speed is low. Accordingly, even if the controller 40 fails at high speed and the failure is detected a time interval after the occurrence thereof which time interval is fixed irrespective of the vehicle speed, the turning angle of the front wheels 8 by which the front wheels 8 are turned before the failure of the controller is detected can be limited without sacrificing the response and that follow of the vehicle to operation of the steering wheel at low speed.

When the first intermediate shaft 4 is rotated in the manner described above and the front wheels 8 are turned by way of the second intermediate shaft 5 and the tie rods 6, the power steering mechanism 7 operates to reduce the force necessary to rotate the steering wheel 1. Said resistance device 24 matches against operation of the steering wheel 1 so that the force required for the driver to rotate the steering wheel 1 becomes optimal and the steering wheel 1 is prevented from being rotated by excessively large amount especially at high speed. At the same time, since the resistance device 24 is provided between the steering ratio changing mechanism 9 and the steering wheel 1, the resistance device 24 does not put any load on the stepping motor 20.

Further since the spiral springs 33 urge the spring shaft 25 in opposite directions even when the steering wheel 1 is in the neutral position, the steering wheel 1 does not wobble during straight running. Further, since the worm 21 is provided on the rotating shaft 11 integrally connected to the output shaft 20a of the stepping motor 20 and the worm wheel 19 in mesh with the worm 21 is formed on the pinion carrier 18 of the differential gear mechanism 13, rotation of the output shaft 20a of the stepping motor 20 is transmitted to the pinion carrier 18 by way of the worm 21 and the worm wheel 19 but external turbulence input into the steering wheel 1 and/or the front wheels 8 is prevented from being transmitted to the stepping motor 20 by way of the differential gear mechanism 13, thereby preventing the output shaft 20a from being loaded. Accordingly, the front wheels 8 can be held at the turned position by a small force and the holding force of the stepping motor 20 may be relatively small.

Further, as shown in FIG. 2, each of the planetary pinions 16 is divided into two gear pieces 16a and the two gear pieces 16a are supported for rotation on the pinion shaft 17. A torsion spring 16b is provided to surround the pinion shaft 17 and the respective ends of the torsion spring 16b are engaged with the gear pieces 16a to urge the gear pieces 16a to rotate in opposite directions. This arrangement is advantageous in that any dimensional error between the sun gear 14 and the ring gear 15 of the differential gear mechanism 13 can be accommodated and backlash in the engagements between the sun gear 14 and the planetary pinions 16 and between the ring gear 15 and the planetary pinions 16 can be restricted.

We claim:

1. A steering system for a vehicle comprising:
   a dirigible wheel turning mechanism for turning the dirigible wheels in response to operation of a steering wheel,
   a steering ratio changing mechanism inserted into the dirigible wheel turning mechanism to change the ratio of the turning angle of the steering wheel to the turning angle of the dirigible wheels,
   a vehicle speed sensor for detecting the vehicle speed,
   a calculating means for calculating a target steering ratio based upon sensed vehicle speed;
   a first control means for controlling the steering ratio changing mechanism to increase the steering ratio as the vehicle speed increases,
   said first control means changing the steering ratio, in response to said calculating means, from an actual steering ratio to the target steering ratio;
   a second control means for reducing, as the vehicle speed increases, the speed of changing of the steering ratio from the actual steering ratio to the target steering ratio;
   the target steering ratio generally increasing in magnitude as sensed vehicle speed increases.

2. A steering system as defined in claim 1 in which said steering ratio changing mechanism includes an actuator for driving a movable element which is moved to change the ratio of turning angle of the steering wheel to the turning angle of the dirigible wheels, said first control means being arranged to control the stroke of the actuator and said second control means being arranged to control the stroke speed of the same.

3. A steering system as defined in claim 1 in which, below a predetermined vehicle speed, said second control means acts to reduce the control speed of the first control means in controlling the steering ratio changing mechanism with increasing vehicle speed and fixes the control speed at a predetermined value in a speed range at and above the predetermined vehicle speed.

4. A steering system for a vehicle comprising:
a dirigible wheel turning mechanism for turning the dirigible wheels in response to operation of a steering wheel,
a steering ratio changing mechanism inserted into the dirigible wheel turning mechanism to change the ratio of the turning angle of the steering wheel to the turning angle of the dirigible wheels,
a vehicle speed sensor for detecting the vehicle speed,
a first control means for controlling the steering ratio changing mechanism to increase the ratio as the vehicle speed increases,
a second control means for reducing, as the vehicle speed increases, the control speed of changing of the first control means in controlling the steering ratio changing mechanism,
said steering ratio changing mechanism comprising a differential gear mechanism including an input gear, an output gear and a counterforce gear, and an actuator for driving the counterforce gear to change the ratio of the turning angle of the steering wheel to the turning angle of the dirigible wheels.

5. A steering system as defined in claim 4 in which the actuator is a pulse motor.

6. A steering system as defined in claim 5 in which said first control means controls the rotating angle of the pulse motor and said second control means controls the rotating speed of the same.

7. A steering system for a vehicle comprising a dirigible wheel turning mechanism for turning the dirigible wheels in response to operation of a steering wheel, a steering ratio changing mechanism inserted into the dirigible wheel turning mechanism to change the ratio of the turning angle of the steering wheel to the turning angle of the dirigible wheels, a vehicle speed sensor for detecting the vehicle speed, a first control means for controlling the steering ratio changing mechanism to increase the ratio as the vehicle speed increases, a second control means for reducing, as the vehicle speed increases, the control speed of the first control means in controlling the steering ratio changing mechanism, a power-steering system for assisting the dirigible wheel turning mechanism in turning the dirigible wheels, and a resistance device for matching operation of the steering wheel under a predetermined force, the resistance device being inserted between the steering ratio changing mechanism and the steering wheel.

* * * * *